United States Patent
Bhatt et al.

(10) Patent No.: US 11,620,489 B2
(45) Date of Patent: *Apr. 4, 2023

(54) PROSPECTIVE MEDIA CONTENT GENERATION USING NEURAL NETWORK MODELING

(71) Applicant: The Nielsen Company (US), LLC, New York, NY (US)

(72) Inventors: Meghana Bhatt, Aliso Viejo, CA (US); Rachel Payne, Aliso Viejo, CA (US)

(73) Assignee: The Nielsen Company (US), LLC, New York, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/930,355

(22) Filed: Jul. 16, 2020

(65) Prior Publication Data
US 2020/0349412 A1 Nov. 5, 2020

Related U.S. Application Data

(63) Continuation of application No. 15/446,741, filed on Mar. 1, 2017, now Pat. No. 10,755,163, which is a continuation of application No. 14/644,092, filed on Mar. 10, 2015, now Pat. No. 9,619,747, which is a (Continued)

(51) Int. Cl.
*G06N 3/02* (2006.01)
*G06N 20/00* (2019.01)
*G06N 3/04* (2006.01)
*G06F 17/16* (2006.01)

(52) U.S. Cl.
CPC ............. *G06N 3/02* (2013.01); *G06F 17/16* (2013.01); *G06N 3/0427* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,904,408 | B1 | 6/2005 | McCarthy et al. |
| 7,840,980 | B2 | 11/2010 | Gutta |
| 8,983,885 | B1 | 3/2015 | Bhatt et al. |
| 9,619,747 | B2 | 4/2017 | Bhatt et al. |
| 9,710,556 | B2 | 7/2017 | Koperski |
| 2007/0011114 | A1 | 1/2007 | Chen et al. |

(Continued)

OTHER PUBLICATIONS

Advisory Action received for U.S. Appl. No. 14/644,092, dated Oct. 5, 2016, 3 pages.

(Continued)

*Primary Examiner* — Daniel T Pellett
(74) *Attorney, Agent, or Firm* — McDonnell Boehnen Hulbert & Berghoff LLP

(57) ABSTRACT

A system for prospectively identifying media characteristics for inclusion in media content is disclosed. A neural network database including media characteristic information and feature information may associate relationships among the media characteristic information and feature information. Personal characteristic information associated with target media consumers may be used to select a subset of the neural network database. A first set of nodes, representing selected feature information, may be activated. The node interactions may be calculated to detect the activation of a second set of nodes, the second set of nodes representing media characteristic information. Generally, a node is activated when an activation value of the node exceeds a threshold value. Media characteristic information may be identified for inclusion in media content based on the second set of nodes.

20 Claims, 5 Drawing Sheets

Related U.S. Application Data continuation of application No. 13/609,141, filed on Sep. 10, 2012, now Pat. No. 8,983,885.

(56) References Cited

U.S. PATENT DOCUMENTS

| | | |
|---|---|---|
| 2007/0208619 A1 | 9/2007 | Branam et al. |
| 2008/0109845 A1 | 5/2008 | Hengel et al. |
| 2008/0249832 A1 | 10/2008 | Richardson et al. |
| 2009/0030780 A1 | 1/2009 | York et al. |
| 2009/0307048 A1 | 12/2009 | Grossman |
| 2010/0235310 A1 | 9/2010 | Gage et al. |
| 2012/0246562 A1 | 9/2012 | Maness et al. |
| 2012/0323833 A1 | 12/2012 | Markram et al. |
| 2015/0186771 A1 | 7/2015 | Bhatt et al. |

OTHER PUBLICATIONS

Bhatt, Meghana, "Three Papers in Neuroeconomics", Thesis, In Partial Ful Iment of the Requirements for the Degree of Doctor of Philosophy California, California Institute of Technology, May 7, 2007, 169 pages.

Final Office Action received for U.S. Appl. No. 14/644,092, dated May 25, 2016, 24 pages.

Haykin, Simon, "Neural Networks: A Comprehensive Foundation. Printice-Hall", New Jersey, 1999, 875 pages.

Jordan et al., "Modular and Hierarchical Learning Systems", The Handbook of Brain Theory and Neural Networks, 1995, pp. 579-582.

Non-Final Office Action received for U.S. Appl. No. 13/609,141, dated Sep. 9, 2014, 21 pages.

Non-Final Office Action received for U.S. Appl. No. 14/644,092, dated Nov. 6, 2015, 20 pages.

Non-Final Office Action received for U.S. Appl. No. 15/446,741, dated Aug. 28, 2019, 21 pages.

Final Office Action received for U.S. Appl. No. 15/446,741, dated Jan. 29, 2020, 20 pages.

Advisory Action received for U.S. Appl. No. 15/446,741, dated May 6, 2020, 3 pages.

Deng, Yong, et al. "A hybrid movie recommender based on ontology and neural networks," 2010 IEEE/ACM Int'l Conference on Green Computing and Communications & Int'l Conference on Cyber, Physical and Social Computing. IEEE, 2010. (Year: 2010).

PROSPECTIVE MEDIA CONTENT GENERATION USING NEURAL NETWORK MODELING

CROSS-REFERENCE TO RELATED APPLICATIONS

This application is a continuation of U.S. patent application Ser. No. 15/446,741, filed Mar. 1, 2017, which is a continuation of U.S. patent application Ser. No. 14/644,092, filed Mar. 10, 2015, which is a continuation of U.S. patent application Ser. No. 13/609,141, filed Sep. 10, 2012, and issued as U.S. Pat. No. 8,983,885 on Mar. 17, 2015, the disclosures of which are herein incorporated by reference in their entirety.

BACKGROUND

1. Field

The present disclosure relates generally to the field of media content generation and, more particularly, to prospective media content generation using neural network modeling to encourage a behavior.

2. Related Art

Conventional media campaigns use media content to encourage certain behaviors in the perceiving audience. Typically, a focus group is assembled to view the media content. Individuals, or the focus group as a whole, may be tracked following the media viewing to analyze changes in behavior or perception. This information may be used to determine the efficacy of the media content with respect to encouraging the behavior. Often, when the media does not sufficiently encourage the behavior, the content of the media is replaced or revised and the process is repeated. This may be time consuming and expensive, often resulting in unsuccessful media campaigns.

BRIEF SUMMARY

Systems and processes for selecting media characteristics for inclusion in a media content are described. A neural network database comprising a plurality of media characteristic information and a plurality of feature information is accessed. The neural network database associates relationships among the plurality of media characteristic information and the plurality of feature information. One or more personal characteristic information associated with one or more target media consumers is received. A subset of the neural network database is selected based on the received one or more personal characteristic information. A selection of one or more feature information of the plurality of feature information is received. A first set of one or more nodes of the subset of the neural network database is activated. The first set of one or more nodes represents the one or more feature information. Node interactions are calculated based on the subset of the neural network database. The activation of a second set of one or more nodes of the subset of the neural network database is detected. The activation of the second set of one or more nodes of the subset of the neural network database is in response to the node interactions calculations. The second set of one or more nodes represents one or more media characteristic information of the plurality of media characteristic information and a node of the subset of the neural network database is activated when an activation value of the node exceeds a threshold value. At least one media characteristic information is identified for inclusion in the media content. The at least one media characteristic information is represented by at least one node of the second set of one or more nodes.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

The embodiments described herein include technologies directed to prospective media content generation using neural network modeling to encourage a particular behavior. A neural network database is developed that associates various characteristics of media with feature information. A subset of the neural network may be selected based on personal characteristic information associated with a target audience. For example, the neural network may be limited to females between a particular age range. This may allow the neural network to be tailored to that particular demographic. The system may activate nodes based on a selection of feature information, where the activated nodes represent the selected feature information. For example, feature information may include information about attributes of media content, attributes of people, attributes of products, attributes of companies, and attributes of brands. Activating these nodes may cause other nodes in the subset of the neural network to be activated or deactivated through calculated node interactions. A second set of nodes that has remained activated or has become activated is identified. The second set of nodes may represent various characteristics of media, which are identified for inclusion in the media content. Media content is created using these various characteristics of media in order to encourage the particular behavior. After the targeted audience views the media content, they may be motivated to take part in the particular behavior that was encouraged.

Figure 1:
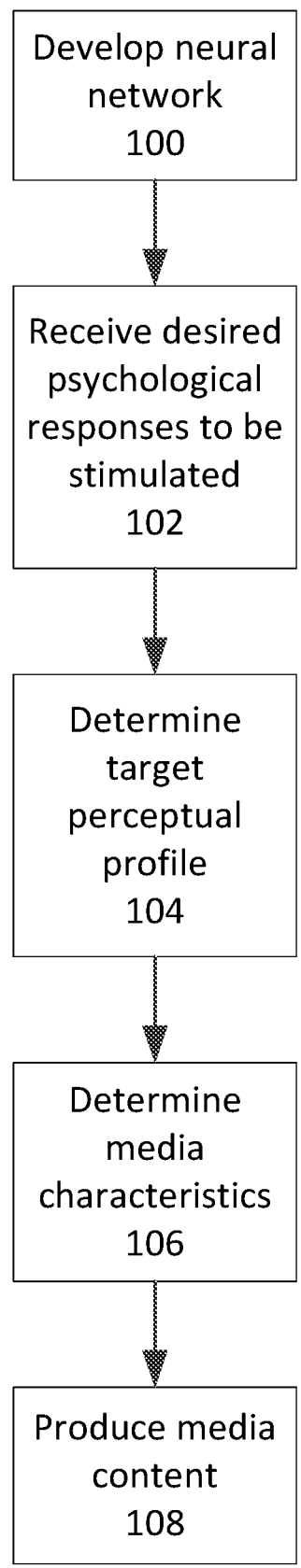
FIG. 1 illustrates an exemplary process for prospectively generating media content.

FIG. 1 illustrates an exemplary process for prospectively generating media content. In block 100, a neural network is developed. In one example, the neural network may be stored in a database. The database may be used to quantify positive and negative associations among features and media characteristics. For example, features may include attributes of media content, attributes of people, attributes of products, attributes of companies, and attributes of brands.

The attributes of media content may be referred to as media characteristics. Thus, media characteristics may be a subset of features. Media characteristics may include attributes of music, visible colors, attributes of actors, attributes of characters portrayed, a portrayed activity, landscapes, and the like of media content. For example, actors may include individuals portrayed in media content. For another example, a one-minute film may have classical piano background music, be predominantly composed of red colors (such as a red piano, red walls or flooring, etc.), include only male actors taller than a certain height, and be set indoors at a residential building.

A portrayed activity may include a portrayal of sex and a portrayal of violence. Attributes of music may include whether there is background music, the genre of the music, the relative volume of the music, the instrumentation of the music, the attributes of the vocals of the background music, and the like. Visible colors may include the colors of wardrobe, props, backgrounds, scenery, translucent and opaque visual overlays, and the like. Attributes of the actors may include the actors' physical appearance, nationality, race, gender, affective display, height, hair color, eye color, clothing, and the like. Attributes of the characters portrayed may include the character's nationality, ethnicity, and the like. Affective display may be an individual's externally displayed affect by, for example, facial, vocal, and gestural means. Affective display may include displays of anger, aggression, strength, laughter, and hatred. Landscapes may include urban settings (such as a city or town), rural settings (such as a countryside or village), mountainous regions, desert regions, outer space, and the like.

Attributes of media content may also include use of different narrative modes, imagery, audio, and the like. Narrative modes may include narrative point of view, such as a first-person perspective, a third-person omniscient perspective, a third-person limited perspective (e.g., overhearing an interaction between two characters), and alternating person view. Narrative modes may also include various narrative voices and various narrative times. Imagery may include national symbols, monuments, and the like. Audio may include the attributes of music, such as whether the music is an instrumental or a vocal, the tempo of the music, the relationship between the viewer's culture and the cultural origin of the music, the volume of the music, the audible instruments in the music, and the like. Audio may also include voice audio and other non-music and non-voice audio.

Attributes of people may include experiences, ethnicity, nationality, gender, sexual orientation, physical characteristics, cultural identity, organizational involvement, social status, socioeconomic status, political orientation, dress preference (e.g., goth, preppy, etc.), what media content they have already consumed, and the like. Attributes of a product may include the product's size, shape, color, composition, cost, and the like. For example, a vehicle's attributes may include the vehicle's color, brand, styling, number of doors, gas consumption, environmental friendliness, and the like. Attributes of a company may include the company's size, revenue, logo design attributes, slogans, marketing policies, and the like. Attributes of a brand may include the brand's logo, trademark, motto, tagline, and brand identity elements.

Features, and thus media characteristics, may be associated with one or more feature types: search features, experience features, and social features. Search features may include features that are readily perceptible through one of the senses—hearing, sight, touch, smell, and taste. For example, search features may include the color, size, or odor of an item. Experience features may include features that require interaction to determine. Social features may include features that are based on social norms, interactions, and personal experience.

In block 102, one or more desired psychological responses to be stimulated are received. In one example, the desired psychological responses to be stimulated may include one or more features to be evoked in the perceiving audience. The one or more features are represented in the neural network. The desired psychological responses to be stimulated may also include specific emotional and social responses, particular behaviors, and directed changes in beliefs and biases. The desired psychological responses to be stimulated may be based on the goals of an associated media campaign.

In block 104, a target perceptual profile is determined. A perceptual profile may be an individual-level neural network or a group-level neural network determined based on personal characteristics of a target audience. For example, the target audience may be based on a demographic, one or more affinities, or preferences that are selected based on the goals of an associated media campaign.

The target perceptual profile may be based on the neural network and the personal characteristics of the target audience. For example, for a target audience that includes individuals with a specified personal characteristic of being female, the neural network may be modified to include only associations among features and media characteristics based on data from females. Thus, a modified neural network may represent the perceptual profile of individuals with a specified personal characteristic. In this example, the modified neural network may generally represent the perceptual profile of females.

In another example, for a target audience that includes individuals with a specified personal characteristic of being female, the neural network may be modified to include only associations among features and media characteristics based on data from individuals with a personal characteristic other than being female. For example, the perceptual profile may be determined based on the feature of wearing lipstick. This may produce valuable results because the personal characteristic of wearing lipstick may be closely associated with the personal characteristic of being female.

In one example, a perceptual profile of a target audience may be selected based on the expected or actual likes and dislikes of the target audience. This may be based on the expectation that individuals with similar likes and dislikes will tend to have similar perceptual profiles. In another example, a perceptual profile of a target audience may be selected based on expected or actual social relationships. This may be based on the expectation that individuals who are socially related will tend to have similar perceptual profiles. Accordingly, a single perceptual profile may be determined to represent the target audience, which may include multiple individuals.

In block 106, media characteristics that may stimulate the desired psychological responses are determined. This may be achieved, for example, by using a perceptual profile that aligns with the target audience of the media campaign. For example, media characteristics that will stimulate specific emotional, cognitive, and identification responses may be determined based on the target perceptual profile and one or more desired psychological responses to be stimulated. The media characteristics may be determined by using the desired psychological responses as an input into the neural network.

In block 108, media content is produced using the determined media characteristics. In one example, multiple variations of the media content may be produced using a varying number or degree of the determined media characteristics. For example, one produced media content may include only a subset of the determined media characteristics, while another produced media content may include all the determined media characteristics.

Figure 2:
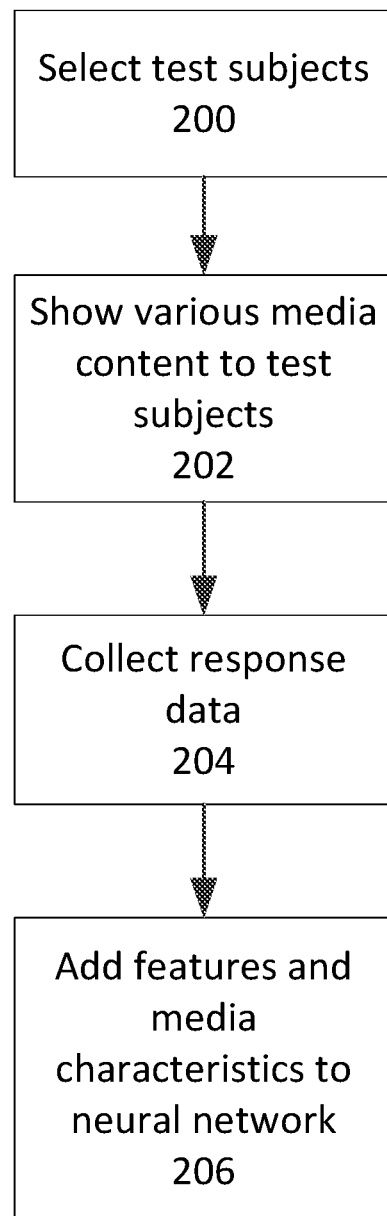
FIG. 2 illustrates an exemplary process for building a neural network.

FIG. 2 illustrates an exemplary process for building a neural network. In block 200, test subjects are selected for analysis. The test subjects may be selected based on their personal characteristics, or they may be selected without regard to their personal characteristics. For example, if a determination is made that the neural network contains insufficient data from individuals possessing a particular personal characteristic, individuals with that particular personal characteristic may be selected for analysis.

In block 202, various media content are shown to the test subjects. The media characteristics of the media content shown to the test subjects may be varied among the various media content. In one example, each test subject will consume only one media content, the media content including one or more determined media characteristics. In another example, each test subject may consume multiple media content, each media content including one or more controlled changes in the media characteristics of the media content.

In block 204, data about the responses of the test subjects who consume the media content is collected. To collect data on the responses of the test subjects, the test subjects may be monitored before, during, and/or after the consumption of the media content. The data collected may be used to determine the psychological responses brought about by the consumed media content. Importantly, varying the media characteristics of the media content may allow for determining which media characteristics are responsible for causing particular psychological responses.

In particular, three types of relationships may be measured. First, the degree of correlation between media characteristics and physiological responses may be measured. Second, the degree of correlation between media characteristics and behavioral responses may be measured. Third, the degree of correlation between physiological responses and behavioral responses may be measured. Physiological responses may include heart rate, pupil dilation and constriction, rate of breathing, and the like. Behavioral responses may include choosing to perform an act, such as exercising, watching a particular television show, eating a particular food, and the like. These relationships associated with responses may be maps in a space different than that from features.

Response data may be determined in many ways. In one example, neurorecording and psychometric techniques may be used to capture three major categories of responses: emotional arousal, cognitive processing, and identification and perspective taking. One of ordinary skill in the art will readily appreciate that neurorecording and psychometric techniques may also be used to capture other categories of responses.

Emotional arousal, also known as emotional engagement, during an experience may enhance the recall of information associated with that experience. For example, individuals may recall such "emotional information" better than information associated with a neutral event. Activation of certain regions of the brain associated with emotion, as measured by functional magnetic resonance imaging (fMRI), may be correlated with long-term recall of emotional information and may be indicative of emotional arousal. Other measurements of emotional engagement are also possible. For example, galvanic skin response (GSR) may be used to determine emotional arousal. Accordingly, the experiences may be positively, negatively, or neutrally associated with emotional arousal in the neural network.

Cognitive processing may also be associated with psychological effects relevant to recall of information. For example, contemplating stressful events, or even traumatic events, may be associated with increased activity in certain areas of the brain associated with cognitive processing. Such increased activity in the areas of the brain associated with cognitive processing may be correlated with enhanced recall of non-emotional information. Accordingly, experienced or perceived events may be positively, negatively, or neutrally associated with stress or trauma.

The ability to identify with characters in a narrative may also be associated with increased recall of information and an increased willingness to follow the behavioral directives presented by the narrative in the media content. For example, the ability to take a first person perspective when viewing media content may be integral to feeling empathy toward others. In another example, the ability to take a removed perspective may be associated with increased emotional and physical long-term health. Accordingly, narrative perspectives may be positively, negatively, or neutrally associated with emotions and experiences in the neural network.

In addition to fMRI and GSR, various other techniques may be used to determine the effects of media characteristics on the consumers of the media. For example, electroencephalography (EEG) may be used to take gross measurements of cognitive processing, including hemispherical differences. Electrocardiography (EKG), pulse rate, and pupil dilation may be used to measure emotional arousal. Additionally, eye tracking may be used to assess the viewer's involvement in the narrative, as well as provide information regarding which elements of the media imagery are the most salient to the viewer.

In one example, neurorecording and psychometric techniques may be used to identify that a particular individual positively associates two features: a particular country and the concept of family. For example, the individual may have traveled to that country and may have experienced that family members in that country are very intimate and close. For another example, the positive association may be a result of the individual having immediate family members that live, or have lived, in that country.

In another example, Internet data may be used to identify positive and negative associations between various features and media characteristics. More specifically, computational linguistic methods may be used to extract data associating various features and media characteristics from social-network profiles, web pages, blogs, microblogs, product reviews, narratives, web browsing histories, and the like. For example, text mining, statistical pattern learning, natural language processing, and sentiment analysis may be used to identify the associations between the various features and media characteristics. The association information may be represented in the neural network.

In block 206, the features and media characteristics are added to the neural network. For example, the neural network may be represented, in part, by nodes and edges and stored in a database on a computer system. Importantly, once the neural network has matured in terms of the number of personal characteristics represented, it may be unnecessary to continue testing actual subjects. Instead, the neural network may be used to determine media characteristics that may stimulate desired psychological responses.

Figure 3:
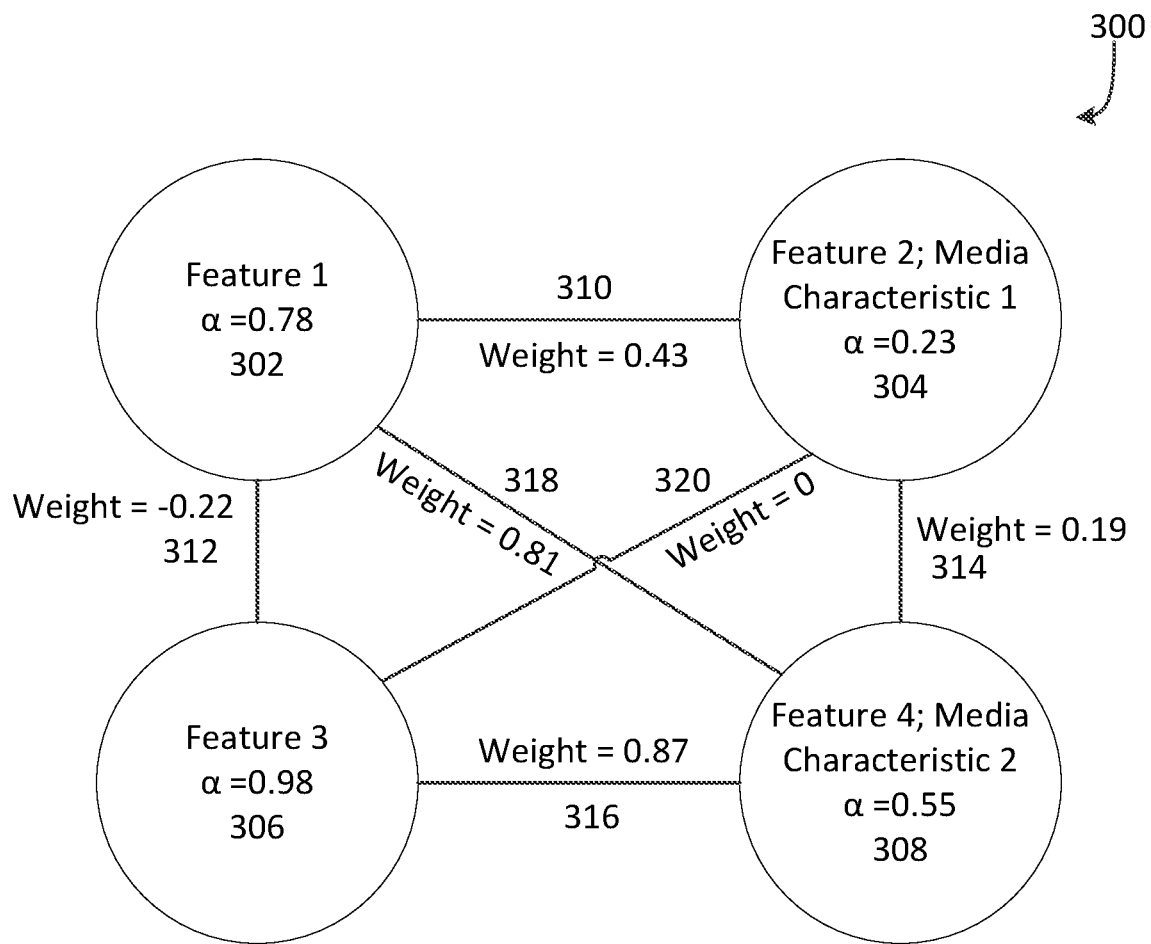
FIG. 3 illustrates an exemplary neural network.

FIG. 3 illustrates an exemplary neural network 300. The neural network 300 may be used to model the psychological changes that are brought about in an individual as a result of the individual's perception of a feature. Encoding features 302, 304, 306, 308 and media characteristics 304, 308 into a single computational space allows the neural network 300 to capture the relationships among the various features 302, 304, 306, 308 and various media characteristics 304, 308. Using these relationships, the neural network 300 formalizes the expected psychological responses that will result from the consumption of media content including media characteristics by an individual or a group of individuals.

A space $S=\{-1,0,1\}^D$ may be defined where D is the number of features. The space S may include both features and media characteristics. Vectors V in this space may be interpreted as follows:

$$V_i = \begin{cases} 1 & V \text{ has characteristic } i \\ -1 & V \text{ does not have characteristic } i \\ 0 & i \text{ is not salient to } V \end{cases}$$

Thus, any node in the network may be in any one of three possible states, $\{1,-1,0\}$. Objects in the space S may be referred to as "patterns." Both features and characteristics of media content may be represented by patterns. E may be defined as the space of all sets of features and media characteristics. That is, E is the space of all finite vectors of elements from S:

$$E \equiv \emptyset \cup S \cup S^2 \cup \ldots = \bigcup_{i=0}^{\infty} S^i$$

An element $P \in E$ is a set of patterns $p \in S$. An individual may have a set of features described by an element $P \in E$. In one example, the same pattern may appear multiple times in P. The patterns in the individual's set of features P affect the way the individual processes information when he or she consumes media content. Specifically, there is some function $A: E \times S \to S$ taking a feature set $P \in E$ and some initial pattern $X^i \in S$ to another pattern $A(P, X^i) \in S$.

The connections 310, 312, 314, 316, 318, 320 between nodes represent the level of positive and negative associations between the nodes. These connection weights may be numbers in $[-1, 1]$ that represent the degree to which two features are related in the experience of the media consumer. For example, an individual may find the features of "fruit" and "health" to be very closely related. This association may be reflected by the weight between the two features, $w_{fruit,health}$, which may be positive and relatively close to 1. In another example, an individual may find the features of "dessert" and "health" to be negatively related. This association may be reflected by the weight between the two features, $w_{dessert,health}$, which may be negative and relatively close to $-1$.

In one example, the three types of measured relationships discussed above, the degree of correlation between media characteristics and physiological responses, the degree of correlation between media characteristics and behavioral responses, and the degree of correlation between physiological responses and behavioral responses, may be used to determine the weights between features. The weights between the features in the neural network may be based on one of the three types of measured relationships, or may be based on a combination of two or more types of measured relationships. In another example, the weights between features may be determined using computational linguistic methods. For example, text mining, statistical pattern learning, natural language processing, and sentiment analysis may be used to determine the weights between features.

In one example, when $P=\emptyset$, $w_{ij}=0$. When $P \neq \emptyset$, for $i \neq j$:

$$w_{ij} = w_{j,i} = \frac{\sum_{p \in P} p_i p_j}{|P|}$$

One of ordinary skill in the art will readily appreciate that other methods for calculating the weights may also be used.

In addition, a node may have a self-connection with a weight $w_{i,i} \geq 0$. This may represent the degree to which the feature represented by the node is "persistent." Persistence may be described as the magnitude of the input that the node sends to itself. Because $w_{i,i} \geq 0$, the input that the node sends to itself may have the same sign as $v_i$, i.e., the input may be congruent with the current state of the node. This self-connection may be defined exogenously.

The state of the neural network may be represented by a vector containing the state of each node in the network, where the elements $V \in S$ describe the states of the neural network. The vector of inputs to each node may be $I=W(P) \cdot V$ in $\mathbb{R}^D$. Thus, the input to node i is $I_i$.

Each node in the neural network may have an activation threshold $\alpha_i$. In one example, $\alpha_i > 0$ for each node in the neural network. In another example, $\alpha_i \geq 0$ for each node in the neural network. For example, the activation thresholds of nodes may be based on estimates of how common the feature is for a particular demographic. The activation thresholds may be determined by analyzing statistical information, social media information, and the like of a particular demographic. Specifically, the activation threshold of a node may be based on how salient a feature, which is represented by the node, is to the particular demographic. Thus, $\alpha_i$ may be inversely proportional to the frequency of the feature (both negative and positive) in an experience set. For example:

$$\alpha_i \propto \frac{|P|}{\sum_{p \in P} |p_i|}$$

In one example, the activation threshold of a node may be based on the three types of measured relationships discussed above: the degree of correlation between media characteristics and physiological responses, the degree of correlation between media characteristics and behavioral responses, and the degree of correlation between physiological responses and behavioral responses. The activation threshold of a node may be based on one of the three types of measured relationships, or may be based on a combination of two or more types of measured relationships. In another example, the activation thresholds of a node may be determined using computational linguistic methods. For example, text mining, statistical pattern learning, natural language processing, and sentiment analysis may be used to determine the activation thresholds of the nodes.

In one example, the activation threshold of a node associated with the feature of "sexy" may be determined for the demographic of women by analyzing one or more television shows with a high viewership of women. The activation threshold may be based on the fraction of characters in the television shows being associated with the feature. When the fraction is large, the activation threshold may be small. A smaller activation threshold may indicate that the feature is more salient to the particular demographic. Alternatively, and less preferably, the activation thresholds of nodes may be defined exogenously.

The higher the value of the threshold $\alpha_i$, the harder it may be to activate the node i. Similarly, the higher the value of the threshold $\alpha_i$, the harder it may be to associate the feature of node i with any other set of features.

The neural network with D nodes may be characterized by the D×D matrix W(P) and the vector of activation thresholds $\alpha$. The states of the nodes in the neural network may be updated based on the updated node's input $I_i$. Preferably, the nodes may be updated asynchronously, i.e., the nodes are updated one at a time. Asynchronous updating rules may be more likely to cause the neural network to converge to a single stable state. For asynchronous updating rules, the order of node updates may be random, or the order of node updates may be based on the attributes of the nodes in the neural network. Alternatively, the nodes may be updated synchronously, i.e., the nodes are updated simultaneously.

Each node may have a transition function T':S→S, where:

$$T_i^i(V) = \begin{cases} -1, & I_i = \sum_j w_{i,j} V_j < -\alpha_i \\ 0, & -\alpha_i \le I_i \le \alpha_i \\ 1, & \alpha_i < I_i \end{cases}$$

$$T_j^i(V) = V_j, j \ne i.$$

When $T_i^j(V)=V_i$, the node may be determined to be stable. Nodes in the network may continue to be updated until $T^i(V)=V$ for all i. This may indicate that the neural network has reached a stable state.

Thus, when a node associated with a feature is activated, the node may contribute to the activation (or deactivation) of connected nodes based on the weighted connections between the nodes. If a connected node is activated, it may also contribute to the activation (or deactivation) of nodes to which it is connected. This may continue to occur until the system has reached equilibrium.

Figure 4:
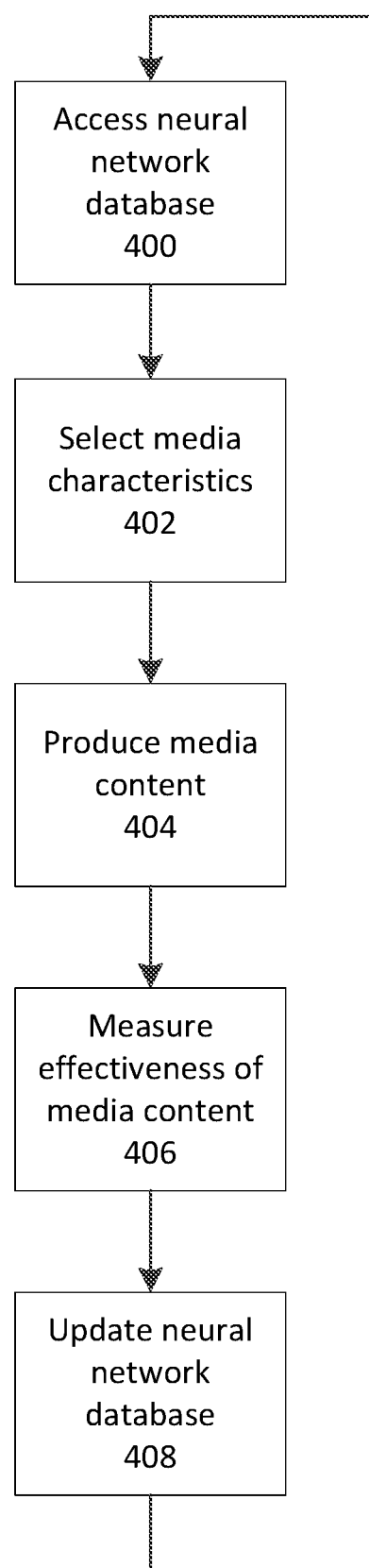
FIG. 4 illustrates an exemplary process for developing and refining a neural network.

FIG. 4 illustrates an exemplary process for developing and refining a neural network for encouraging a certain behavior. At block 400, a database including a neural network describing specific effects of narrative techniques, imagery, and music on affective processing, cognitive processing, and perspective taking is accessed. The database may include quantified relationships among the various narrative techniques, imagery, music and the affective processing, cognitive processing, and perspective taking. In block 402, the database is used to select specific media characteristics that may engage specific affective processing, cognitive processing, and perspective taking. The selection of the specific media characteristics is based on the desired behavior to be induced. In block 404, media content is produced that includes the selected media characteristics. In block 406, a focus group of individuals is used to measure the effectiveness of consuming the media content with respect to encouraging the certain behavior. This may be done by performing neurorecording and physiological recording on the focus group while the focus group is consuming the media content. In block 408, the measured effectiveness of consuming the media content with respect to encouraging the certain behavior is used to update the strength of the connections among the features in the neural network. This process may be repeated in order to repeatedly refine the neural network database.

In one example, the system may receive information about a media characteristic. The system may determine how the existing neural network associated with an intended audience will evolve when the intended audience perceives the media characteristic in media content. For example, given that an actor will be portrayed in a particular manner in media content, the system may determine the expected changes that may occur in the neural network based on the intended audience perceiving the actor being portrayed in the particular manner. Activation thresholds and weights of the neural network may be modified based on these expected changes.

Figure 5:
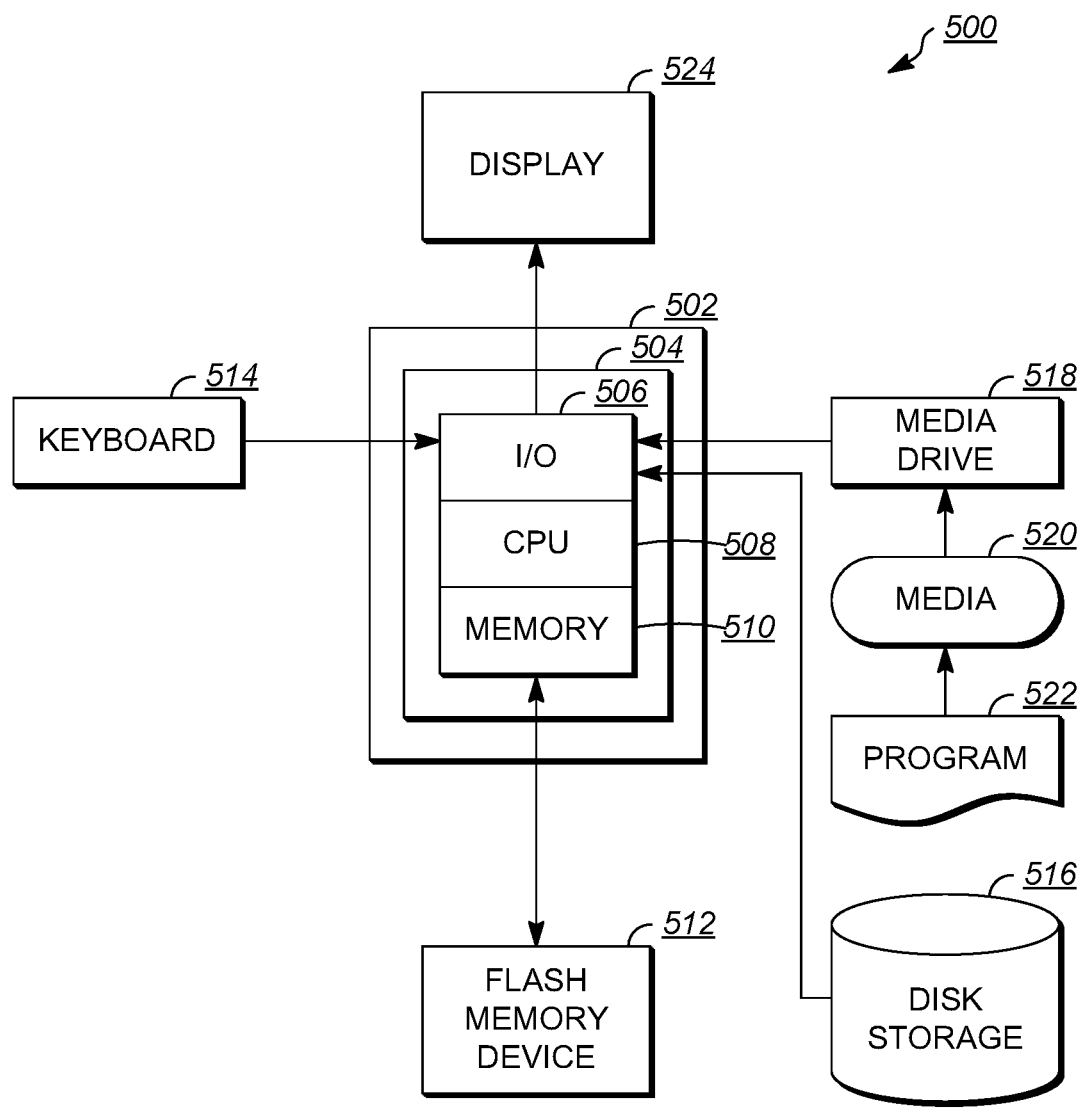
FIG. 5 illustrates an exemplary computing system.

FIG. 5 depicts an exemplary computing system 500 configured to perform any one of the above-described processes. In this context, computing system 500 may include, for example, a processor, memory, storage, and input/output devices (e.g., monitor, keyboard, touchscreen, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform the above-described processes. The main system 502 includes a motherboard 504 having an input/output ("I/O") section 506, one or more central processing units ("CPU") 508, and a memory section 510, which may have a flash memory device 512 related to it. The I/O section 506 is connected to a display 524, a keyboard 514, a disk storage unit 516, and a media drive unit 518. The media drive unit 518 can read/write a computer-readable medium 520, which can contain programs 522 and/or data. The I/O section 506 may also connect to cloud storage using, for example, cellular data communications or wireless local area network communications.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Perl, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computing system configured for performing a set of acts comprising:
   accessing a neural network database that stores weights of a neural network, wherein the weights of the neural network are indicative of a plurality of associations between a plurality of media characteristic information and a plurality of feature information; and using the neural network to select an attribute of an actor for inclusion in a media content by:

receiving a selection of a feature to be evoked in a target consumer, wherein the feature is a subset of the plurality of feature information, based on the selection, activating a first set of one or more nodes of the neural network, the first set of one or more nodes representing the feature, calculating node interactions based on the neural network, detecting the activation of a second set of one or more nodes of the neural network, the second set of the one or more nodes of the neural network being activated in response to the calculating node interactions, and selecting the attribute of the actor based on the attribute of the actor being represented by at least one node of the second set of one or more nodes.

2. The computing system of claim 1, wherein the set of acts further comprises:

receiving personal characteristic information associated with the target consumer; and selecting a subset of the neural network based on the received personal characteristic information, wherein the subset of the neural network excludes portions of the neural network based on the excluded portions not corresponding to the personal characteristic information.

3. The computing system of claim 2, wherein using the neural network to select the attribute of the actor comprises using the subset of the neural network to select the attribute of the actor.

4. The computing system of claim 2, wherein the personal characteristic is selected from the group consisting of age, gender, nationality, race, ethnicity, sexual orientation, socioeconomic status, and political orientation.

5. The computing system of claim 1, wherein the feature is selected from the group consisting of an attribute of a person, an attribute of a product, an attribute of a company, and an attribute of a brand.

6. The computing system of claim 1, wherein detecting the activation of the second set of one or more nodes of the neural network comprises:

determining at least one threshold value; and comparing the at least one threshold value to an activation value, the activation value at least partially calculated based on the node interactions calculation.

7. The computing system of claim 1, wherein calculating node interactions based on the neural network comprises calculating an activation value based on a weighted sum of one or more input values received by at least one node of the second set of one or more nodes.

8. A method comprising:

accessing a neural network database that stores weights of a neural network, wherein the weights of the neural network are indicative of a plurality of associations between a plurality of media characteristic information and a plurality of feature information; and using the neural network to select an attribute of an actor for inclusion in a media content by:

receiving a selection of a feature to be evoked in a target consumer, wherein the feature is a subset of the plurality of feature information, based on the selection, activating a first set of one or more nodes of the neural network, the first set of one or more nodes representing the feature, calculating node interactions based on the neural network, detecting the activation of a second set of one or more nodes of the neural network, the second set of the one or more nodes of the neural network being activated in response to the calculating node interactions, and selecting the attribute of the actor based on the attribute of the actor being represented by at least one node of the second set of one or more nodes.

9. The method of claim 8, further comprising:

receiving personal characteristic information associated with the target consumer; and selecting a subset of the neural network based on the received personal characteristic information, wherein the subset of the neural network excludes portions of the neural network based on the excluded portions not corresponding to the personal characteristic information.

10. The method of claim 9, wherein using the neural network to select the attribute of the actor comprises using the subset of the neural network to select the attribute of the actor.

11. The method of claim 9, wherein the personal characteristic is selected from the group consisting of age, gender, nationality, race, ethnicity, sexual orientation, socioeconomic status, and political orientation.

12. The method of claim 8, wherein the feature is selected from the group consisting of an attribute of a person, an attribute of a product, an attribute of a company, and an attribute of a brand.

13. The method of claim 8, wherein detecting the activation of the second set of one or more nodes of the neural network comprises:

determining at least one threshold value; and comparing the at least one threshold value to an activation value, the activation value at least partially calculated based on the node interactions calculation.

14. The method of claim 8, wherein calculating node interactions based on the neural network comprises calculating an activation value based on a weighted sum of one or more input values received by at least one node of the second set of one or more nodes.

15. A computing system configured for performing a set of acts comprising:

accessing a neural network database that stores weights of a neural network, wherein the weights of the neural network are indicative of a plurality of associations between a plurality of media characteristic information and a plurality of feature information; and using the neural network to select a portrayed activity for inclusion in a media content by:

receiving a selection of a feature to be evoked in a target consumer, wherein the feature is a subset of the plurality of feature information, based on the selection, activating a first set of one or more nodes of the neural network, the first set of one or more nodes representing the feature, calculating node interactions based on the neural network, detecting the activation of a second set of one or more nodes of the neural network, the second set of the one or more nodes of the neural network being activated in response to the calculating node interactions, and selecting the portrayed activity based on the portrayed activity being represented by at least one node of the second set of one or more nodes.

16. The computing system of claim 15, wherein the set of acts further comprises:

receiving personal characteristic information associated with the target consumer; and selecting a subset of the neural network based on the received personal characteristic information, wherein the subset of the neural network excludes portions of the neural network based on the excluded portions not corresponding to the personal characteristic information.

17. The computing system of claim 16, wherein using the neural network to select the portrayed activity comprises using the subset of the neural network to select the portrayed activity.

18. The computing system of claim 16, wherein the personal characteristic is selected from the group consisting of age, gender, nationality, race, ethnicity, sexual orientation, socioeconomic status, and political orientation.

19. The computing system of claim 15, wherein the feature is selected from the group consisting of an attribute of an actor, an attribute of a person, an attribute of a product, an attribute of a company, and an attribute of a brand.

20. The computing system of claim 15, wherein detecting the activation of the second set of one or more nodes of the neural network comprises:

determining at least one threshold value; and comparing the at least one threshold value to an activation value, the activation value at least partially calculated based on the node interactions calculation.

* * * * *